(12) United States Patent
Englert et al.

(10) Patent No.: US 11,465,662 B2
(45) Date of Patent: *Oct. 11, 2022

(54) POWERED SLED

(71) Applicant: Rehrig Pacific Company, Los Angeles, CA (US)

(72) Inventors: Travis James Englert, Brea, CA (US); Joseph E. Popovits, II, Costa Mesa, CA (US); Derick Foster, Cumming, GA (US); Dane Gin Mun Kalinowski, Foothill Ranch, CA (US); Sayre Giorgio Peralta, Los Angeles, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,165

(22) Filed: Apr. 9, 2021

(65) Prior Publication Data

US 2021/0229719 A1    Jul. 29, 2021

Related U.S. Application Data

(63) Continuation of application No. 16/797,230, filed on Feb. 21, 2020, now Pat. No. 10,988,154.

(60) Provisional application No. 62/810,319, filed on Feb. 25, 2019.

(51) Int. Cl.
*B66F 9/12* (2006.01)
*B62B 3/06* (2006.01)
*B62B 5/00* (2006.01)

(52) U.S. Cl.
CPC .......... *B62B 3/06* (2013.01); *B62B 5/004* (2013.01); *B62B 5/0043* (2013.01); *B62B 5/0053* (2013.01); *B62B 5/0066* (2013.01); *B62B 5/0069* (2013.01); *B60L 2200/44* (2013.01); *B60Y 2200/15* (2013.01); *B66F 9/12* (2013.01)

(58) Field of Classification Search
CPC ....... B62B 5/0485; B62B 5/04; B62B 5/0461; B62B 3/04; B66F 9/07509; B66F 9/20; B60K 7/0007; B60K 2007/0038; B60L 2200/42; B60L 2200/44
See application file for complete search history.

(56) References Cited

U.S. PATENT DOCUMENTS

| | | | | |
|---|---|---|---|---|
| 2,787,747 A * | 4/1957 | Drummond | .......... | H02K 16/005 318/45 |
| 4,669,561 A * | 6/1987 | Sheen | .......... | B62B 3/0612 180/19.1 |
| 4,816,998 A * | 3/1989 | Ahlbom | .......... | G05D 1/0272 180/167 |
| 5,894,898 A * | 4/1999 | Catto | .......... | B62K 3/002 180/2.2 |
| 7,040,443 B1 * | 5/2006 | Roth | .......... | B62K 3/002 180/221 |
| 7,270,201 B1 * | 9/2007 | Cryer | .......... | B60S 13/00 180/19.2 |

(Continued)

*Primary Examiner* — Emma K Frick
(74) *Attorney, Agent, or Firm* — Carlson, Gaskey & Olds, P.C.

(57) ABSTRACT

A pallet sled includes a base and a pair of tines extending from the base. A load wheel supports outer ends of each of the tines. A wheel supports the base. At least one motor is configured to drive the base wheel or at least one of the load wheels for driving the pallet sled. The motor may be a hub motor inside the base wheel or the load wheel.

10 Claims, 21 Drawing Sheets

(56) References Cited

U.S. PATENT DOCUMENTS

| | | | | |
|---|---|---|---|---|
| 7,665,555 B2* | 2/2010 | Rose | ............... | B62D 51/001 |
| | | | | 180/19.2 |
| 7,789,188 B2* | 9/2010 | Standke | ............... | B66F 9/20 |
| | | | | 180/332 |
| 9,227,645 B2* | 1/2016 | Franco | ............... | B62B 5/087 |
| 9,809,434 B2* | 11/2017 | Magoto | ............ | B65D 19/0018 |
| 9,908,549 B2* | 3/2018 | Newell | ............ | B62B 5/0076 |
| 10,479,661 B2* | 11/2019 | King | ............... | B62B 3/0612 |
| 10,603,236 B2* | 3/2020 | Kottmann | ............ | A61G 7/08 |
| 2015/0166314 A1* | 6/2015 | Xu | ............... | B62B 3/0643 |
| | | | | 414/809 |
| 2016/0368747 A1* | 12/2016 | O'Connell | ............ | B66F 9/065 |
| 2017/0297881 A1* | 10/2017 | King | ............... | B66F 9/143 |
| 2019/0075726 A1* | 3/2019 | White | ............... | A01D 34/824 |

\* cited by examiner

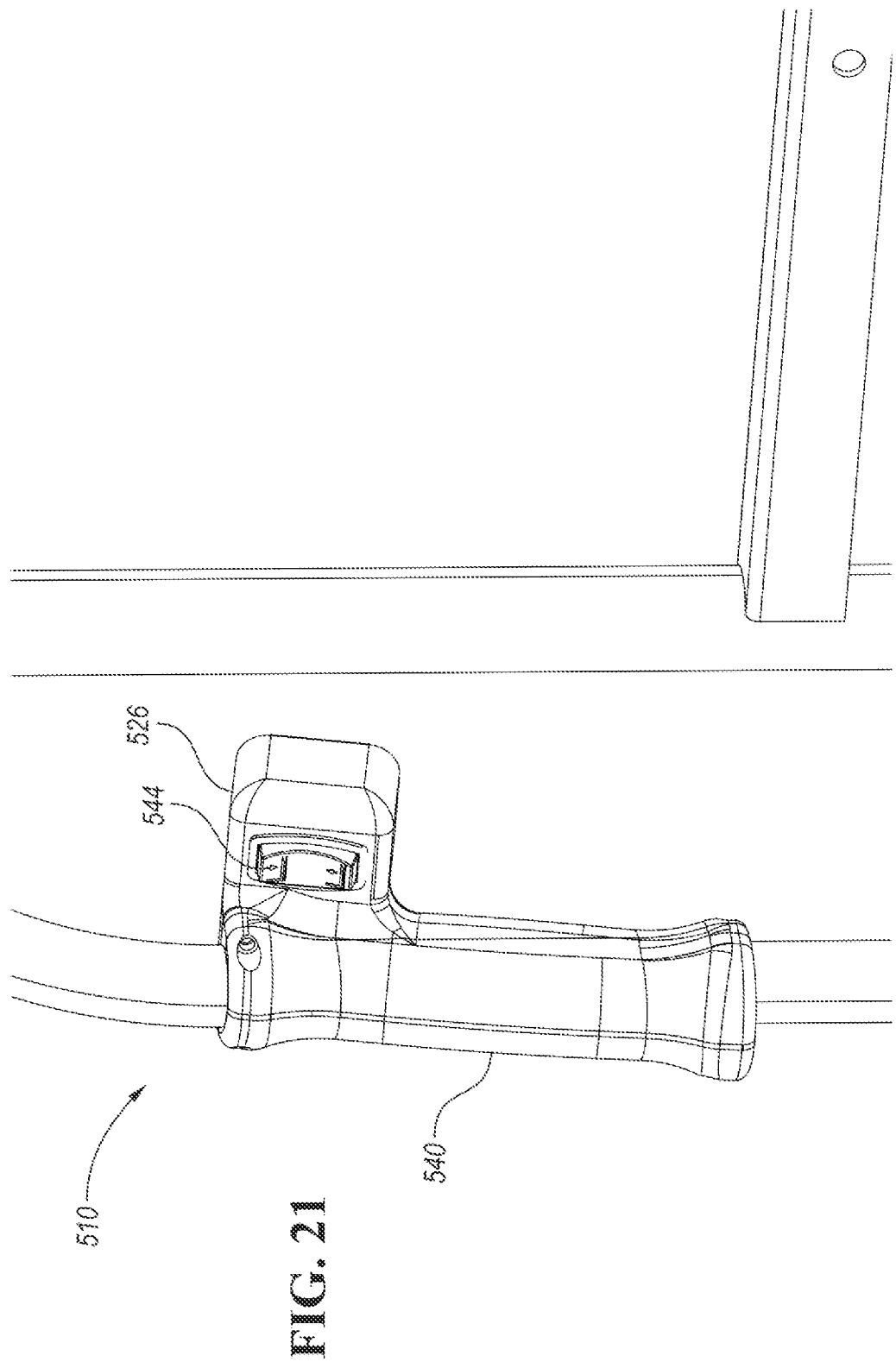

POWERED SLED

BACKGROUND

There are many environments within the food service and retail industries, such as restaurants, office complexes, retail stores and hospitals, that do not allow electric lifts inside due to the actual or perceived threat of being too heavy, bulky, or risky in terms of potentially causing store damage.

SUMMARY

The powered sled disclosed herein increases delivery efficiencies by reducing the amount of time and labor an operator needs to deliver product (raw goods, finished goods, etc.) to the food service or retail environment. The sled may allow the driver to transport a fully loaded pallet directly from the trailer to inside the store without having to down stack product onto a hand truck and make multiple trips back and forth.

This powered sled includes an electric motor or motors and batteries to provide propulsion in forward and reverse. The powered drive is especially useful when moving heavy pallet loads across parking lots, up ramps and slopes, and over thresholds that may be encountered throughout the delivery process. The batteries may also provide power to lift the pallet load, or a hydraulic foot pump may be utilized, similar to an existing delivery sled.

This lightweight powered sled would be allowed in those environments, would provide powered drive to the operator and still maintain all the benefits of existing sled designs, such as lightweight, compact design, highly maneuverable and zero turn radius about the load wheels.

The sleekness of the compact and concealed electric drive components would ensure that the powered sled is never mistaken for a heavy electric lift and would operate with very minimal noise, which is ideal for the food service and retail environments, especially when customers are also in the vicinity.

The electric motors may be powered by an external battery pack that is mounted to the rear of the sled near the operator and can be quickly and easily removed and replaced with a fully charged battery when depleted. Also, the battery pack may be easily accessed and does not need to be removed from the sled in order to plug in and charge the batteries when the sled is not in use, such as in between delivery stops on the trailer, or in the warehouse at the end of the delivery day.

The preset motor parameters, such as maximum speed, acceleration rates, decelerations rates, braking rates, throttle maps, etc, may be controlled by an electronic motor controller that is mounted within the frame of the sled and connected to the motor(s) and battery pack. These parameters are set by the manufacturer, but the customer may also be able to adjust certain parameters, depending on user preference, intended usage and/or environment.

The powered drive and speed of the sled may be controlled by the operator via a throttle control mounted to the handlebars and is completely optional. The powered sled operates just like a traditional manual sled (operator pushes the sled and associated load) when not using the motor(s) and the drive mechanism allows the wheels to "freewheel" or spin freely without added friction when disengaged from power. This is helpful in tight environments, such as coolers or freezers, or when powered drive is not allowed, such as in certain store environments.

The sled may also have a brake lever or switch that applies a braking force via regenerative braking through the hub motors. This is helpful for the operator to reduce speed and assist in maintaining control of the sled, especially when going down slopes and ramps.

BRIEF DESCRIPTION OF THE DRAWINGS

FIG. 21 is an enlarged view of the lift control of FIG. 19.

DETAILED DESCRIPTION

Figure 1:
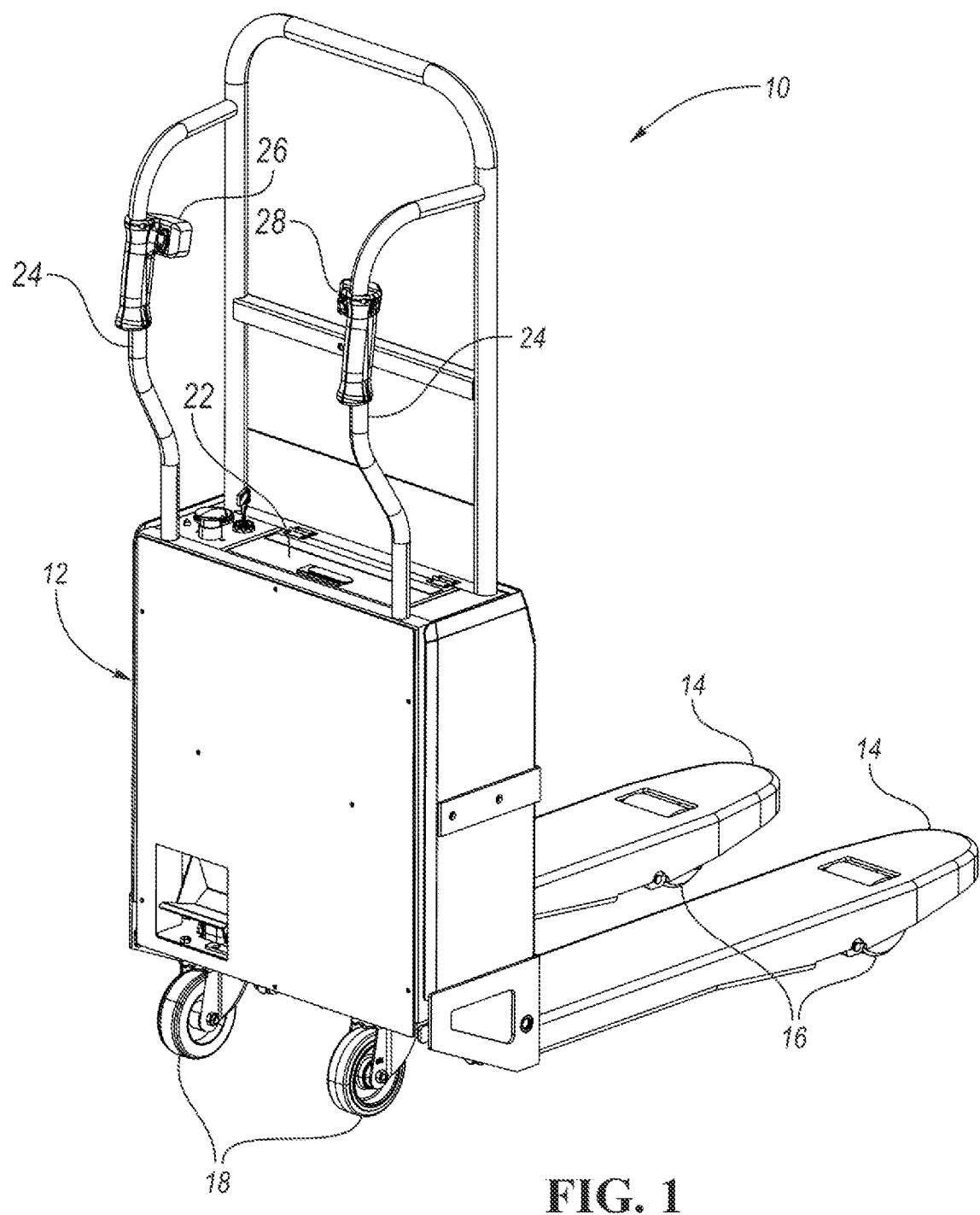
FIG. 1 is a perspective view of a pallet sled according to one embodiment.

A powered sled 10 for transporting pallets is shown in FIG. 1. The sled 10 includes a lift module or base 12 connected to a pair of tines 14. The base 12 can raise and lower the tines 14, such as by leveraging the load wheels 16 supporting outer ends of the tines 14. Casters 18 may support the base 12.

A battery 22 is also mounted in the base 12 for driving motors within the load wheels 16, as will be explained below. Upright handles 24 extend upward from the base 12. A lift control 26 is connected to the handles 24. A throttle control 28 is also connected to the handles 24.

Figure 2:
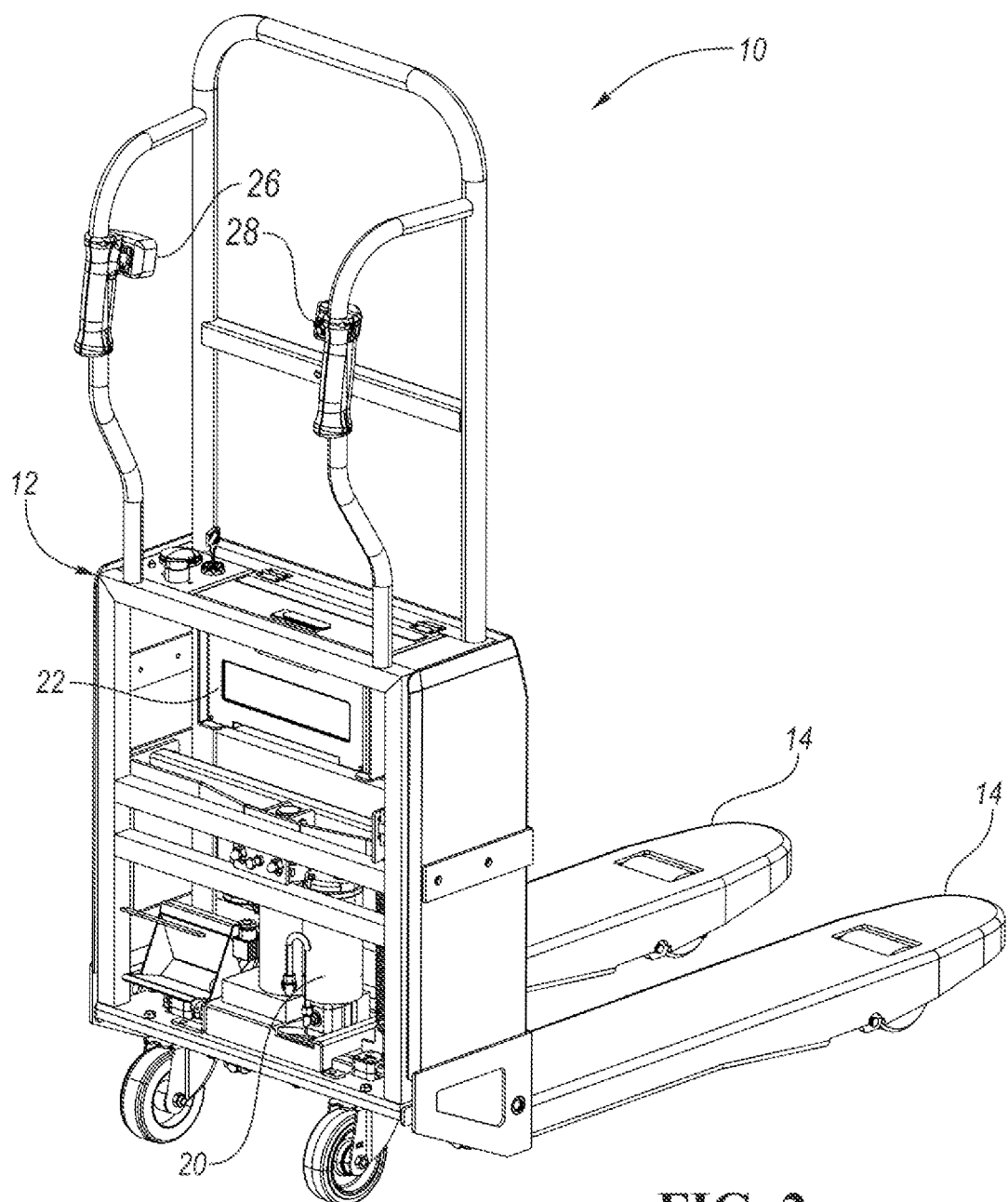
FIG. 2 shows the sled of FIG. 1 with the rear panel removed.

FIG. 2 shows the sled 10 with a rear cover removed. The sled 10 that is shown includes an electro-hydraulic pump 20 for raising and lowering the tines 14. The pump 20 may be powered by the removable battery 22. Alternatively, a hydraulic foot pump or other mechanism for lifting the tines 14 may be utilized.

Figure 3:
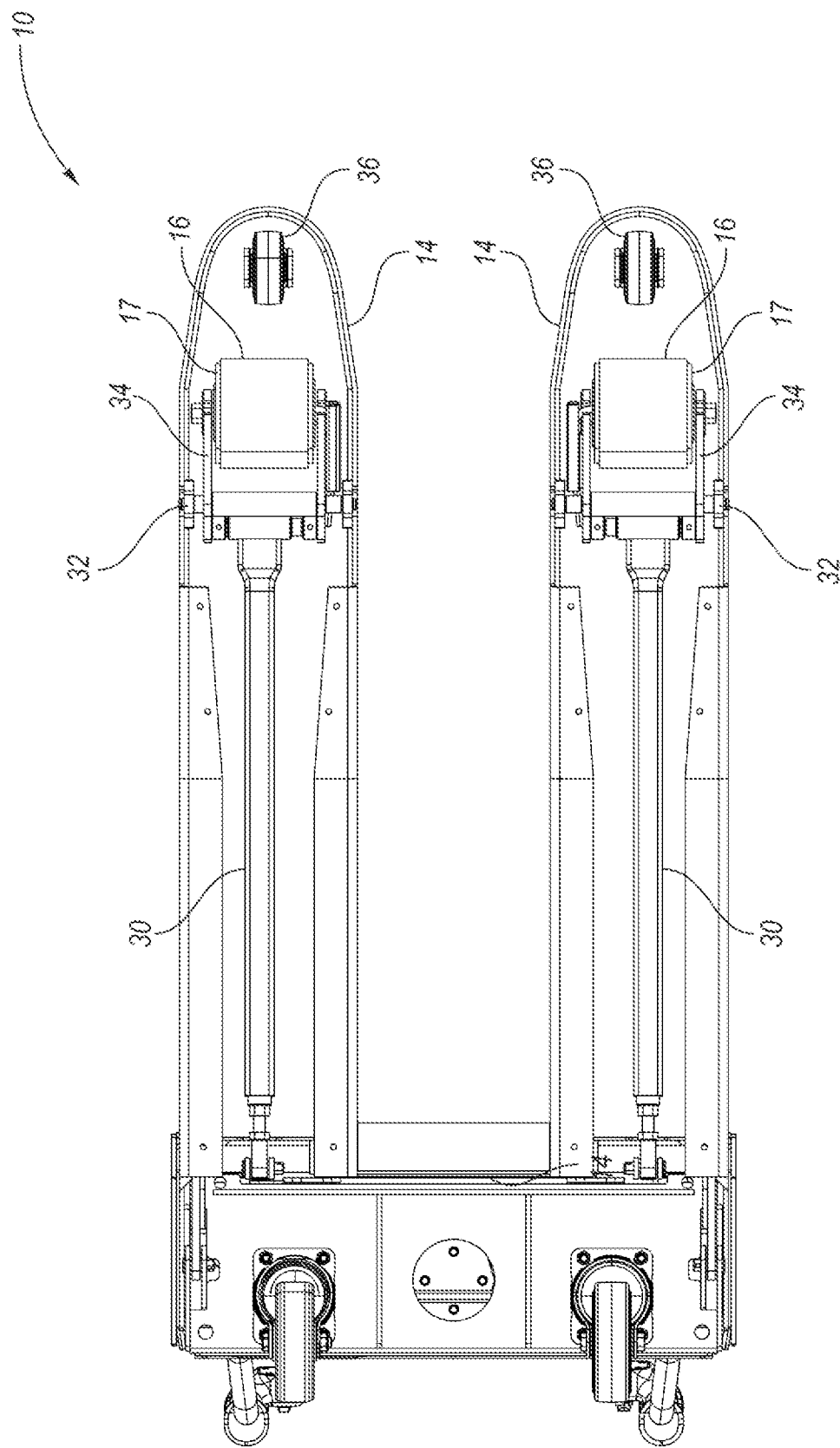
FIG. 3 is a bottom view of the sled of FIG. 1.

FIG. 3 is a bottom view of the sled 10. Referring to FIG. 3, each load wheel 16 is mounted at the end of a pair of arms 34, which are pivotably mounted at opposite ends to the tine 14 at pivot axis 32. As is well-known, a push rod 30 leverages the arms 34 up and down to raise and lower the load wheels 16. In this example, the push rods 30 are powered by the pump 20 (FIG. 2) as controlled by the lift control 26 (FIG. 1).

Figure 4:
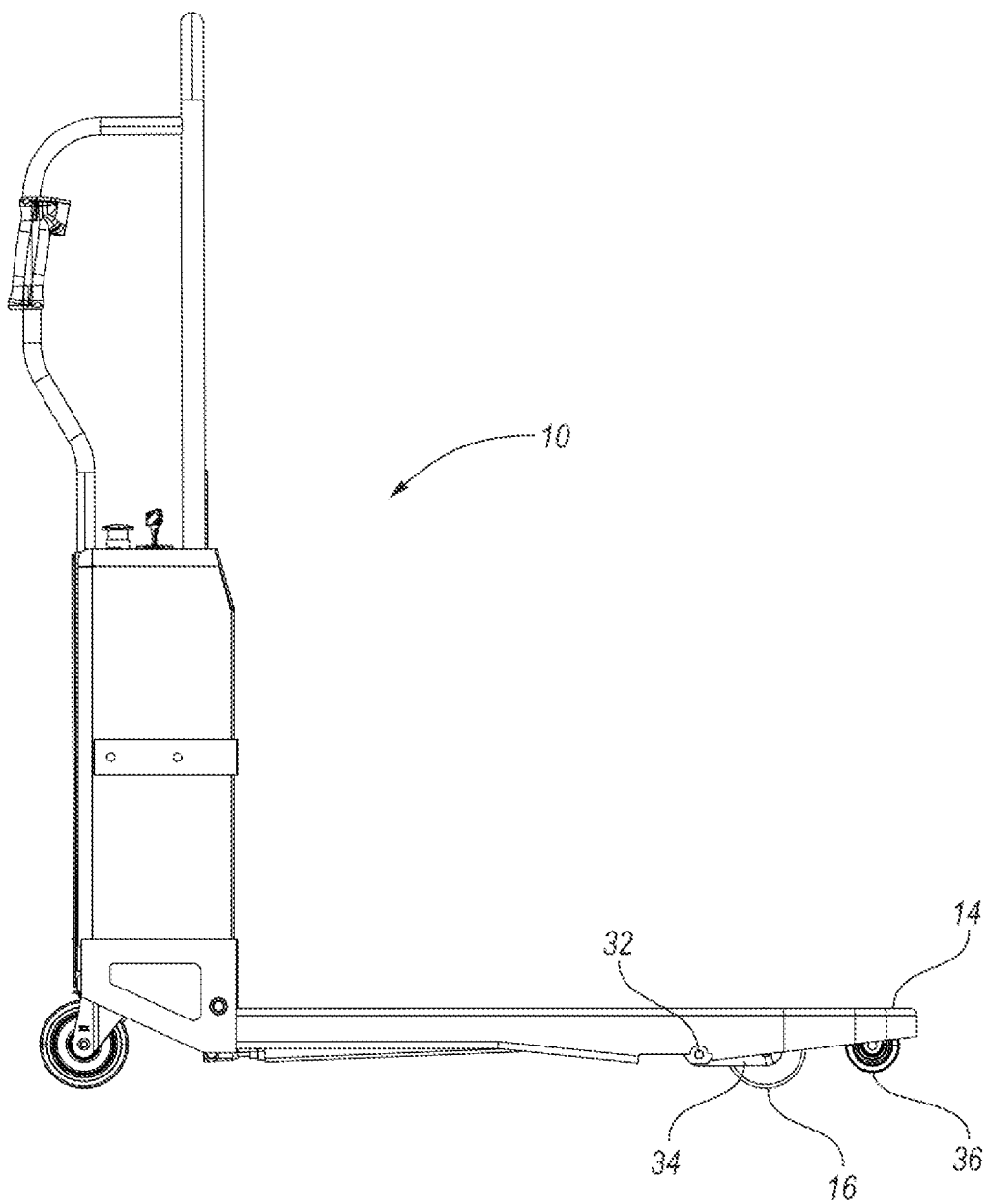
FIG. 4 is a side view of the sled of FIG. 1.

In this embodiment, the load wheels 16 include hub motors 17. The hub motors 17 selectively receive power from the battery 22 (FIG. 1) to drive the load wheels 16 rotatably. Both hub motors 17 may be controlled by the single throttle 28 (FIG. 1). Alternatively, dual throttle controls (one for each hub motor 17) would allow the operator to steer the sled 10. A free spinning lead wheel 36 is mounted at the front of each tine 14 and spaced above the floor (FIG. 4) to assist in contact with curbs, ramps, etc. As another alternative, a hub motor 17 may be provided in only one of the load wheels 16, while the other load wheel is free spinning.

Figure 5:
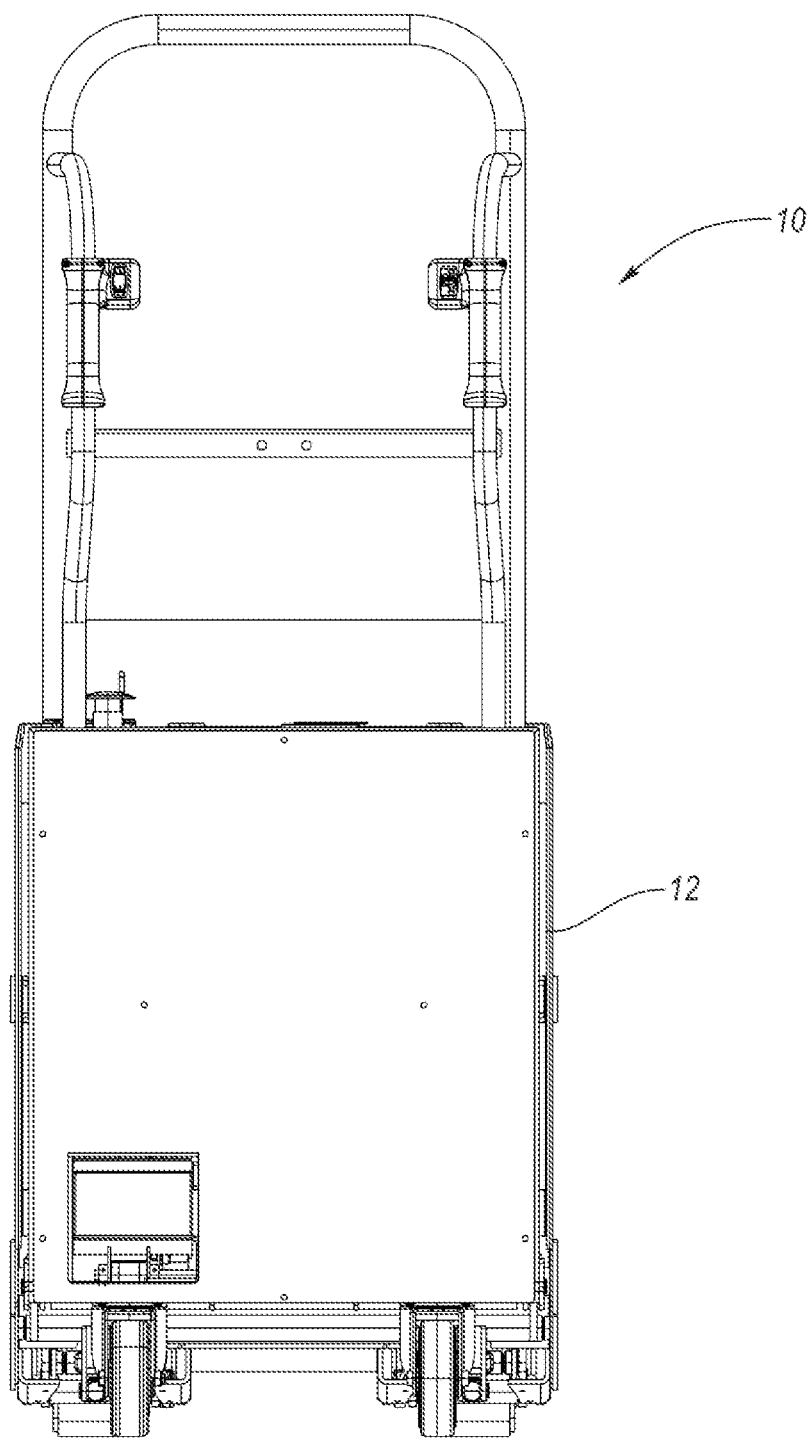
FIG. 5 is a rear view of the sled 10.
Figure 6:
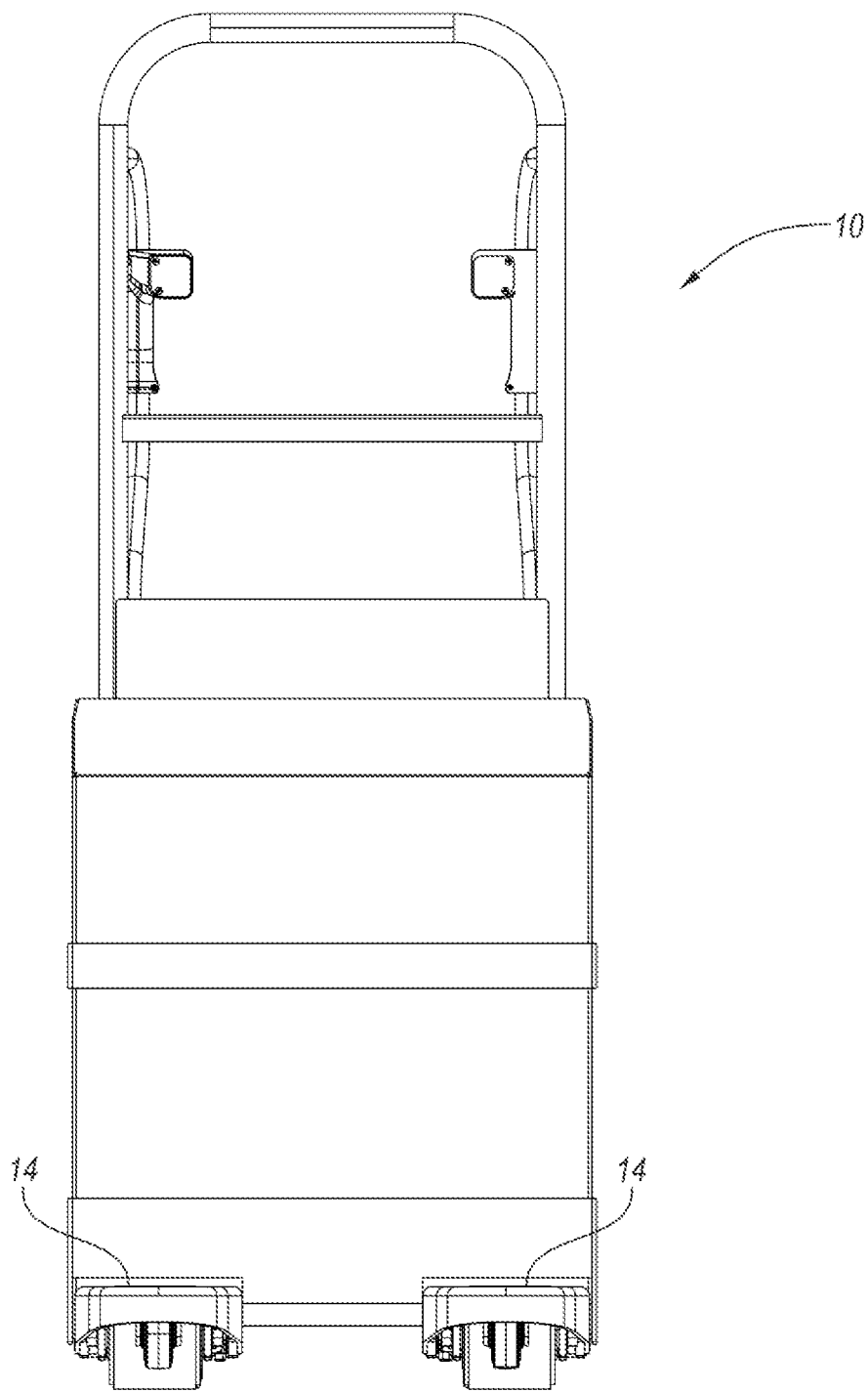
FIG. 6 is a front view of the sled 10.
Figure 7:
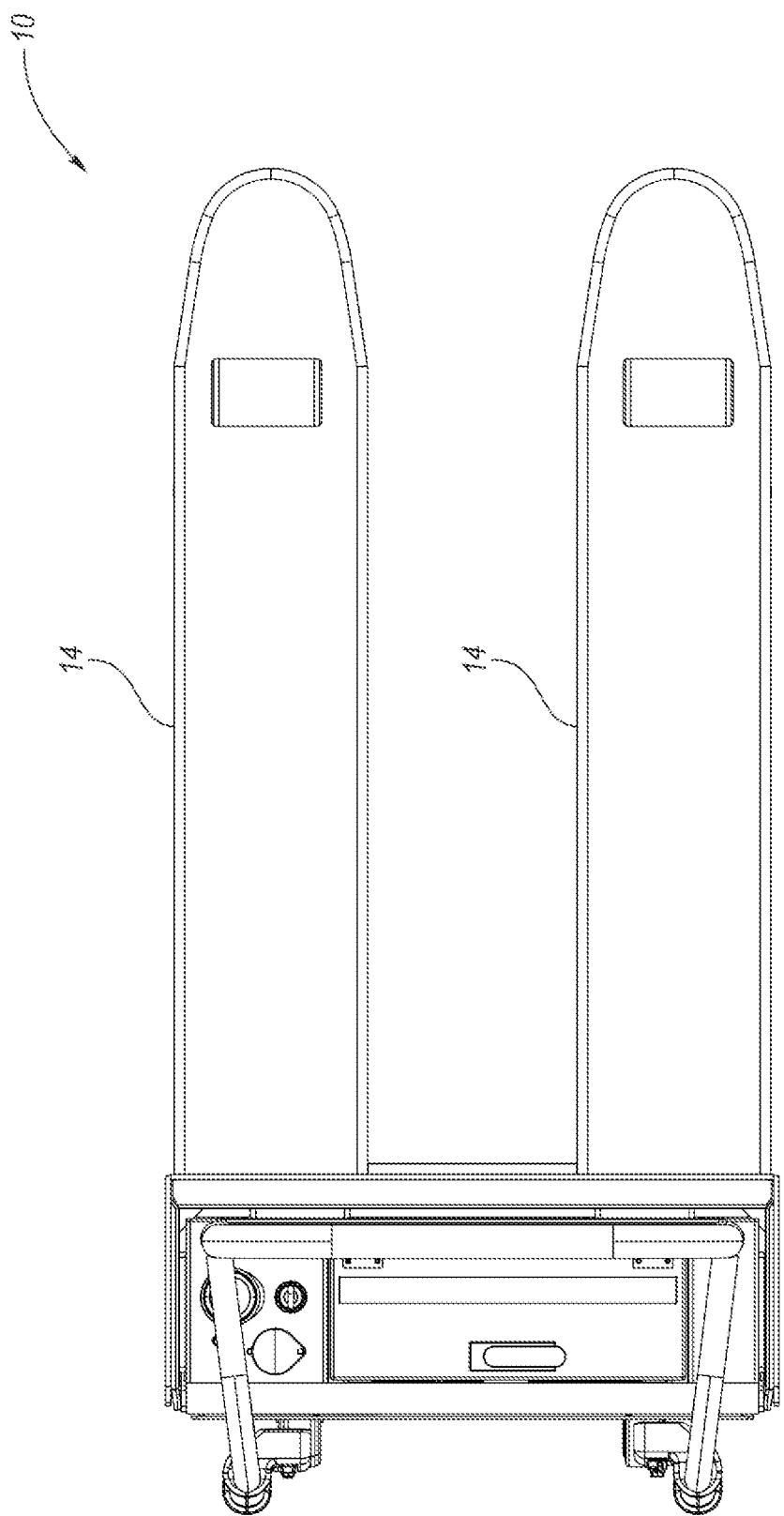
FIG. 7 is a top view of the sled 10.

FIG. 5 is a rear view of the sled 10. FIG. 6 is a front view of the sled 10. FIG. 7 is a top view of the sled 10.

Figure 8:
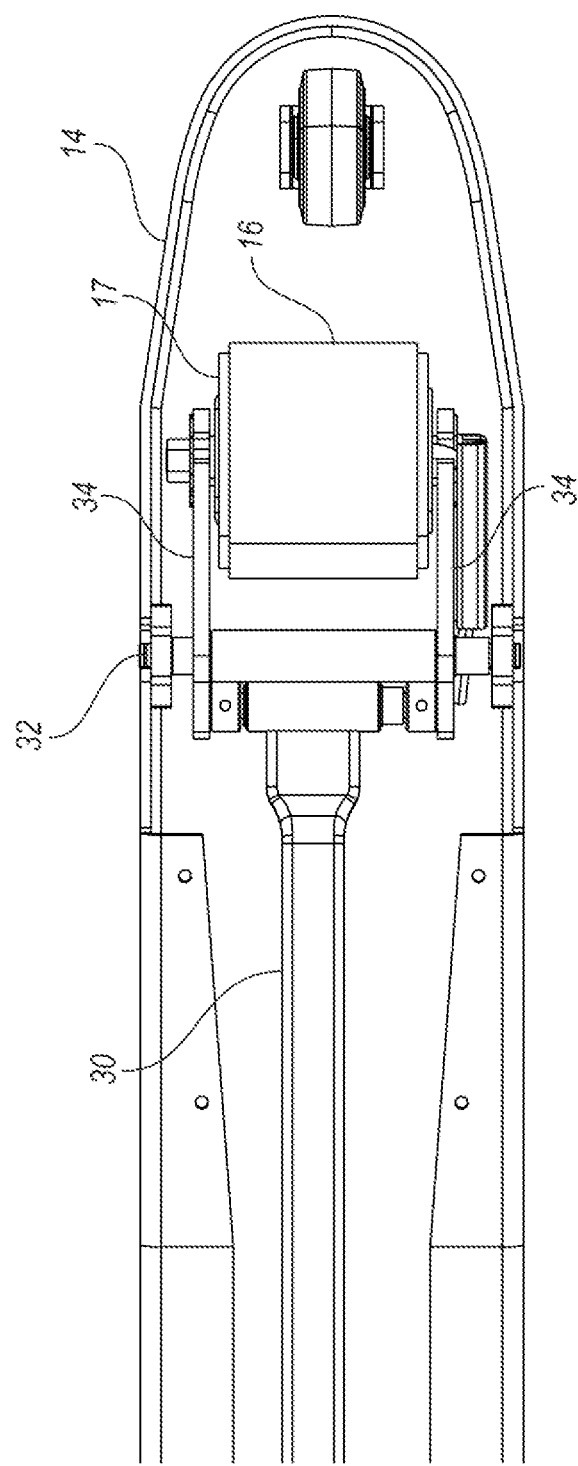
FIG. 8 is an enlarged view of the bottom of a forward end of one of the tines of the sled of FIG. 1.
Figure 9:
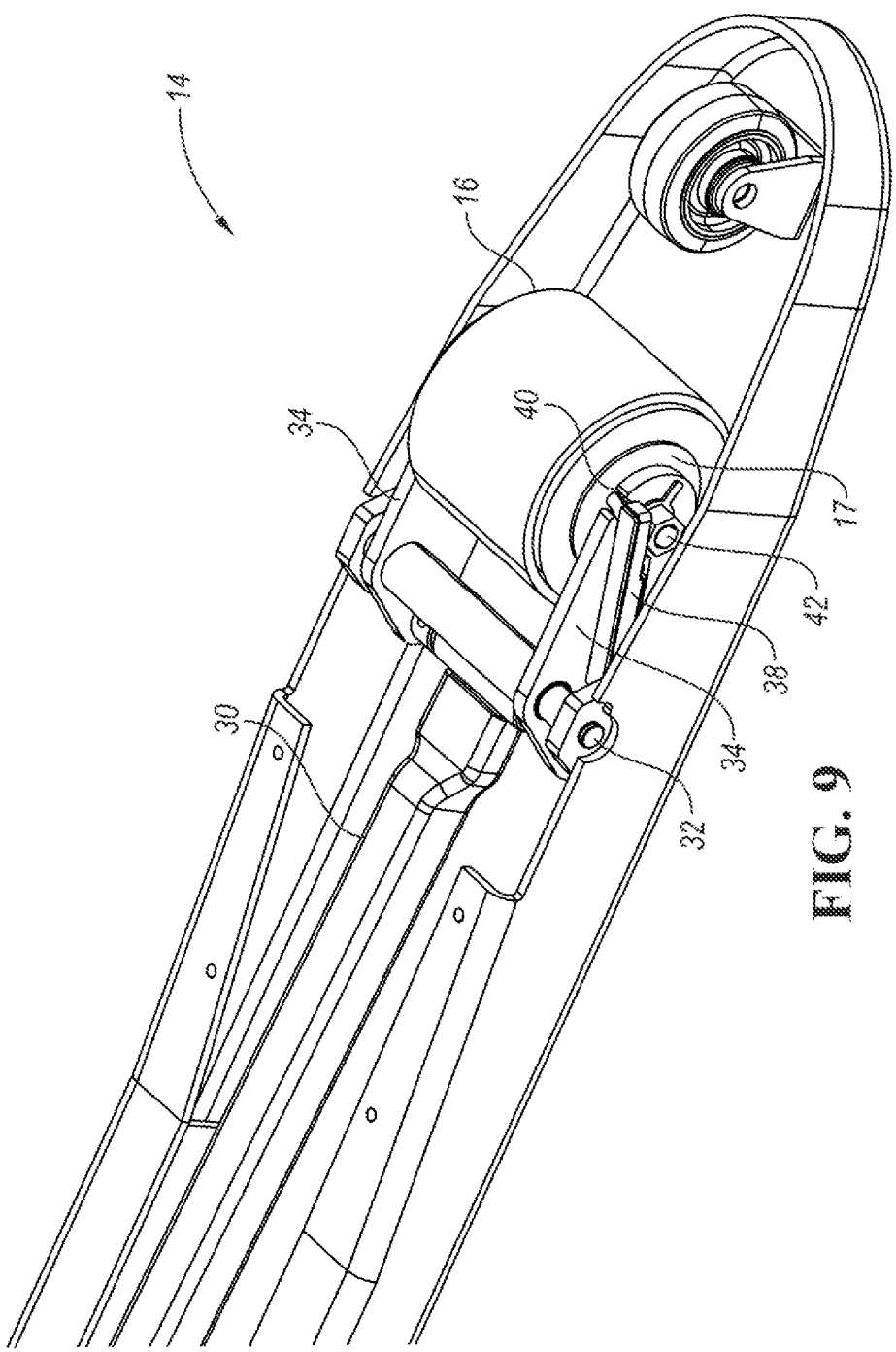
FIG. 9 is a perspective view of the forward end of the tine of FIG. 8.

FIGS. 8 and 9 are enlarged bottom views of the forward end of one of the tines 14. Again, the load wheel 16 is mounted between a pair of arms 34 via the hub motor 17, which can receive power (e.g. electrical power) via a conduit 38 from the battery 22 (FIG. 2) as controlled by the throttle control 28 (FIG. 2). As is known, the forward portion of the arms 34 engages the load wheel 16, while the push rod 30 engages a rear portion of the arms 34 rearward of the axis 32. The rear portion of the arms 34 angles upward. As is known, axial movement of the pushrod 30 toward the outer end of the tine 14 causes the arms 34 to pivot about the axis 32 and causes the load wheel 16 to pivot downward relative to the tine 14, thereby lifting the tine 14 relative to the floor. Axial movement of the pushrod 30 away from the outer end of the tine 14 causes the arms 34 to pivot about the axis 32 and causes the load wheel 16 to pivot upward toward to the tine 14, thereby lowering the tine 14 relative to the floor.

Figure 10:
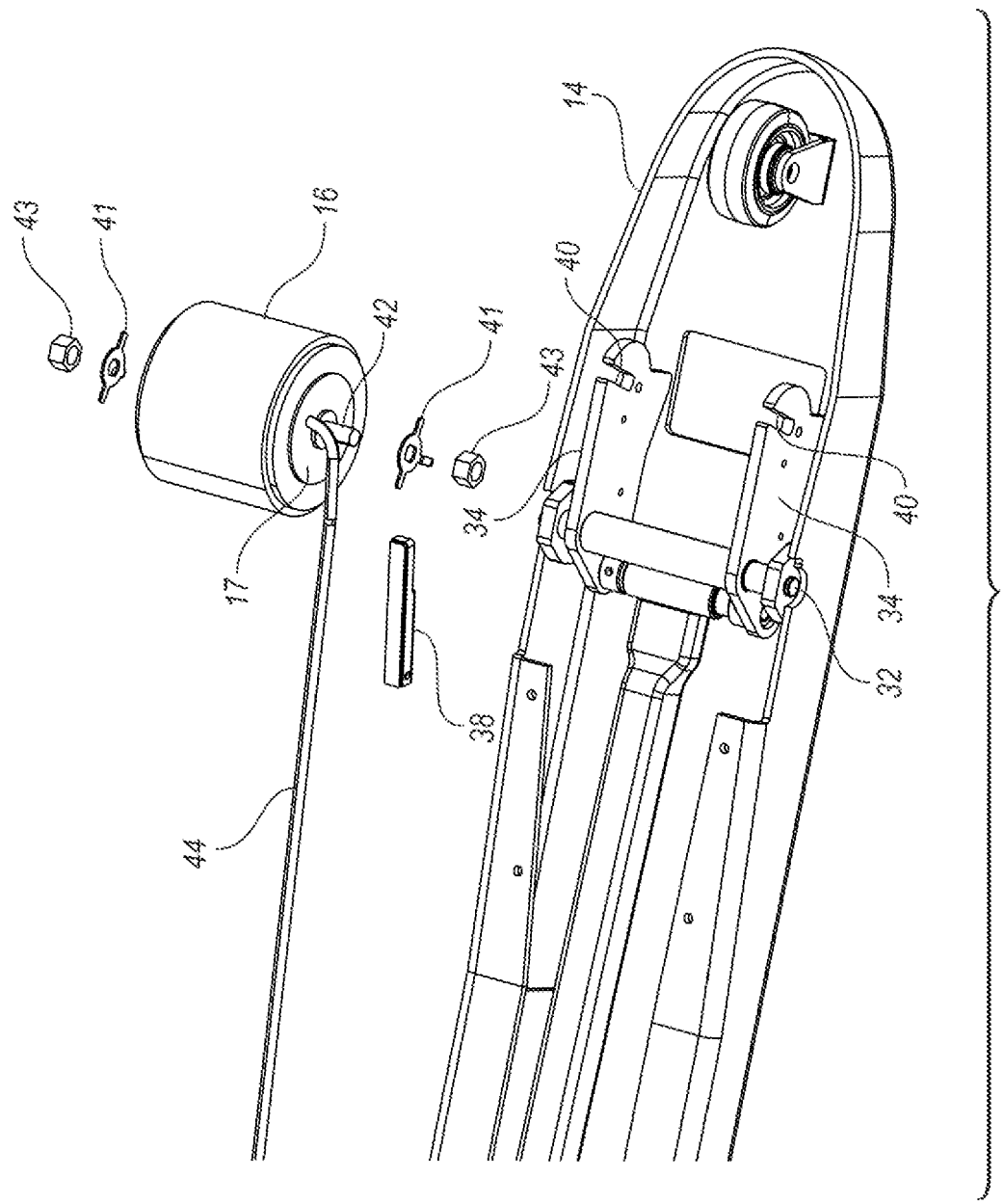
FIG. 10 is an exploded perspective view of the forward end of the tine of FIG. 8.

Referring particularly to FIG. 10, the forward ends of the arms 34 each include a slot 40 for receiving an axle 42 of the hub motor 17, about which the load wheel 16 is rotated by the hub motor 17. The slots 40 are elongated and substantially vertical angling slightly forward and opening downwardly. The axle 42 may have flats to prevent rotation of the axle 42 within the slot 40. The axle 42 is secured in the slots 40 by a pair of keyed washers 41 and a pair of axle nuts 43. The keyed washers 41 include projections received in apertures in the arm 34. The keyed washers 41 also include apertures complementary to the flats on the axle 42. By loosening the axle nuts and removing the keyed washers 41, the load wheel 16 can be slid out of the slot 40. A quick connect or other electrical coupling can easily disconnect the hub motor 17 from wiring 44 in the conduit 38. The rest of the wiring 44 is routed within the fork tine 14 where it is protected. In this manner it is relatively easy to remove and replace the wheel 16 and hub motor 17 if necessary.

Figure 11:
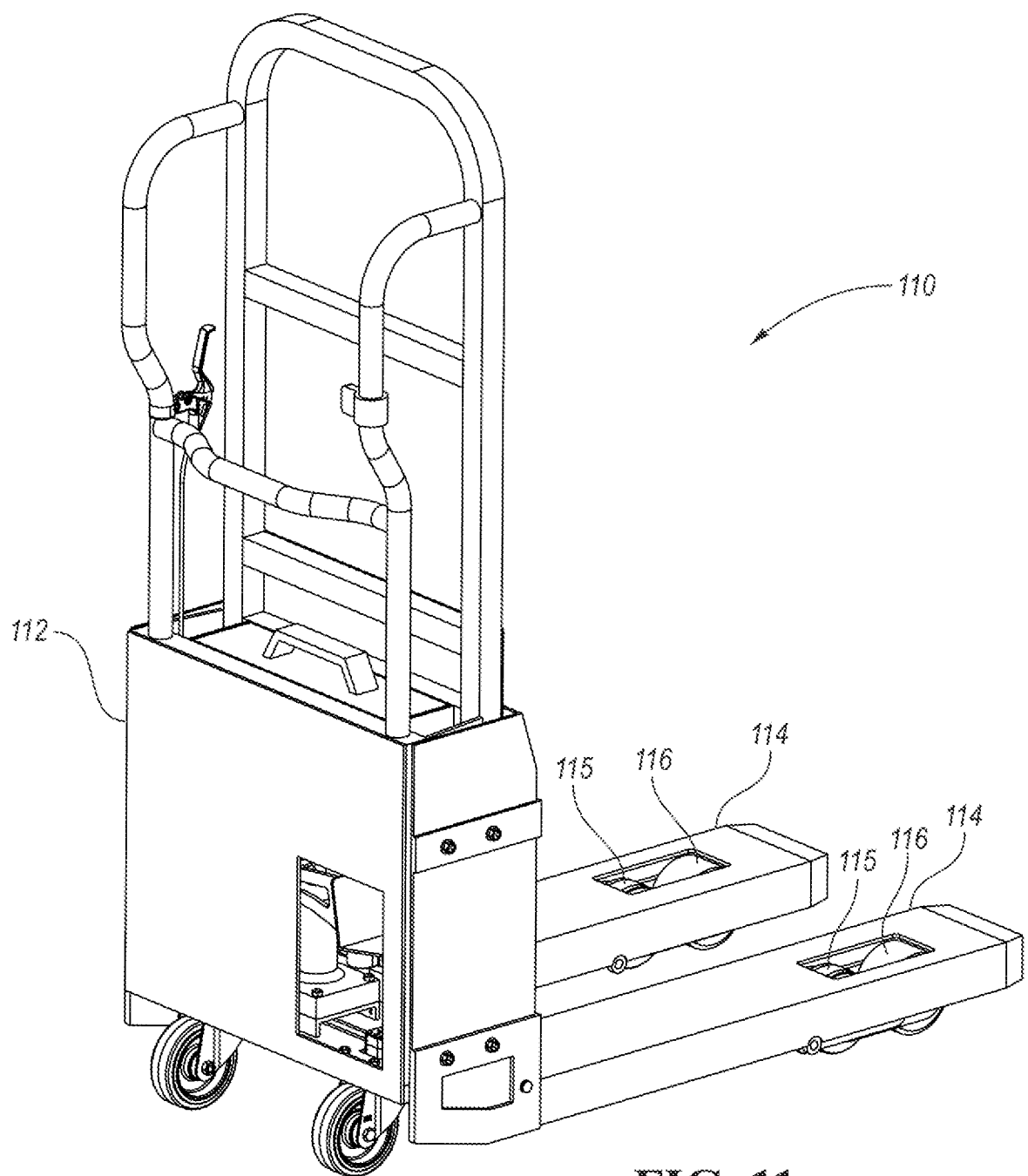
FIG. 11 is a perspective view of a sled according to a second embodiment.
Figure 12:
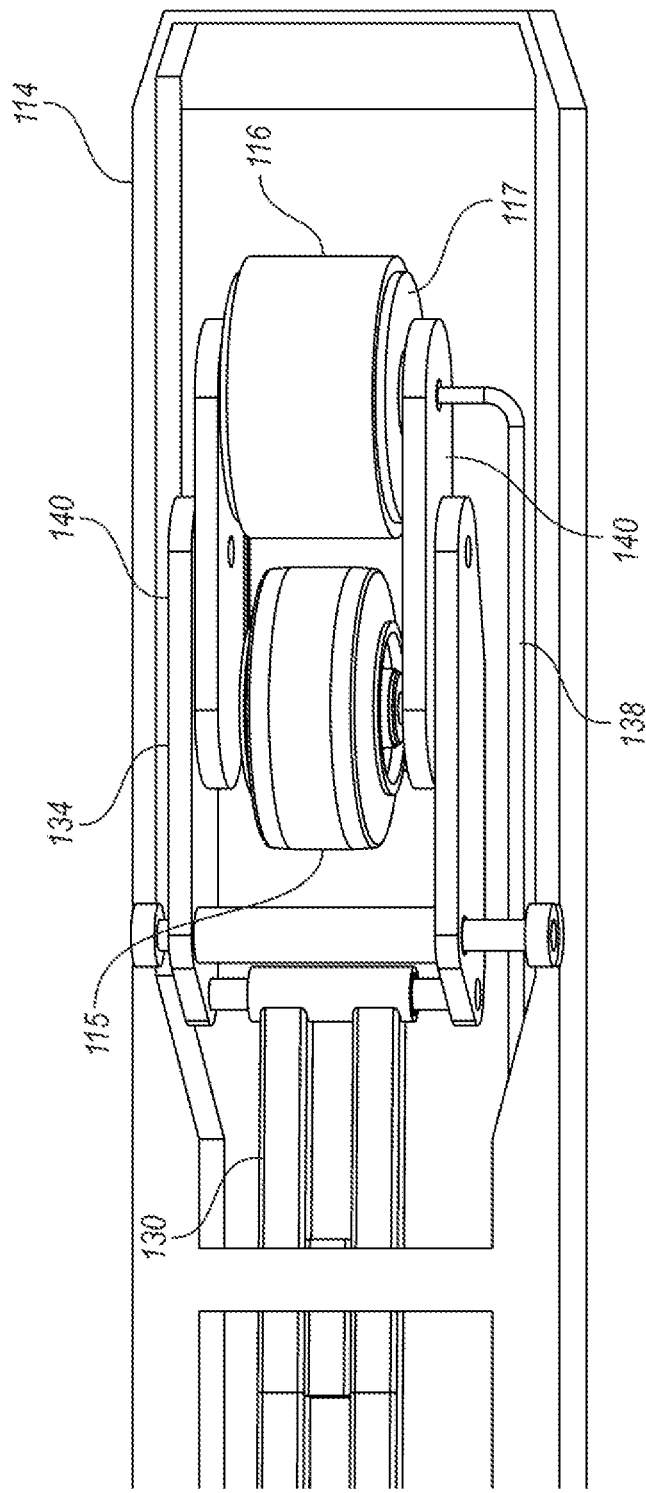
FIG. 12 is an enlarged view of the bottom of a forward end of one of the tines of the sled of FIG. 11.

FIGS. 11 and 12 show a sled 110 according to a second embodiment, which is similar to that of FIGS. 1-10, except as otherwise described or shown. Referring to FIG. 11, the sled includes a base 112 connected to a pair of tines 114. Each tine 114 includes a primary load wheel 115 adjacent an outer end thereof. In this embodiment, a hub motor 117 in a secondary load wheel 116 is operated in tandem with the primary load wheel 115 in each tine 114.

Referring to FIG. 12, the primary load wheel 115 and hub motor 117 are each mounted to ends of a pair of tandem plates 140. The tandem plates 140 are pivotably mounted near their centers to outer ends of the arms 134, which raise and lower the primary load wheel 115 and hub motor 117 (with secondary load wheel 116) relative to the tine 114 (to raise and lower the tine 114). Both the primary load wheel 115 and secondary load wheel 116 contact the floor. This provides load distribution between the secondary load wheel 116 and the primary load wheel 115 and may facilitate easier climbs over thresholds, for example.

As with the first embodiment, the hub motor 117 in tandem with the secondary load wheel 116 may be placed under both tines 114 or, alternatively, only under one of the two tines 114. Also, optionally, the hub motor 117 may be mounted in front of or behind the primary load wheel 115. A conduit 138 provides power to each hub motor 117.

Figure 13:
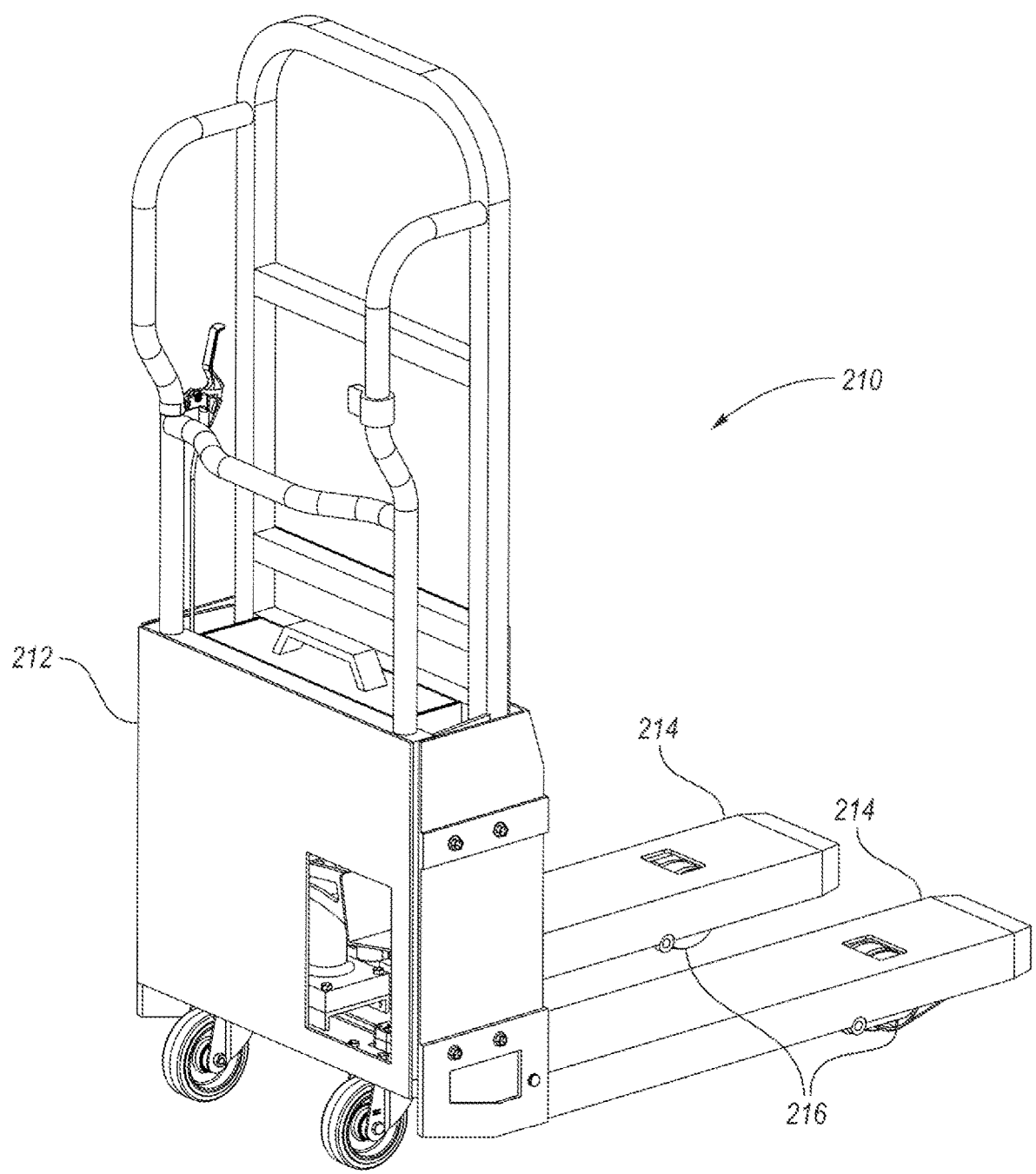
FIG. 13 is a perspective view of a sled according to a third embodiment.
Figure 14:
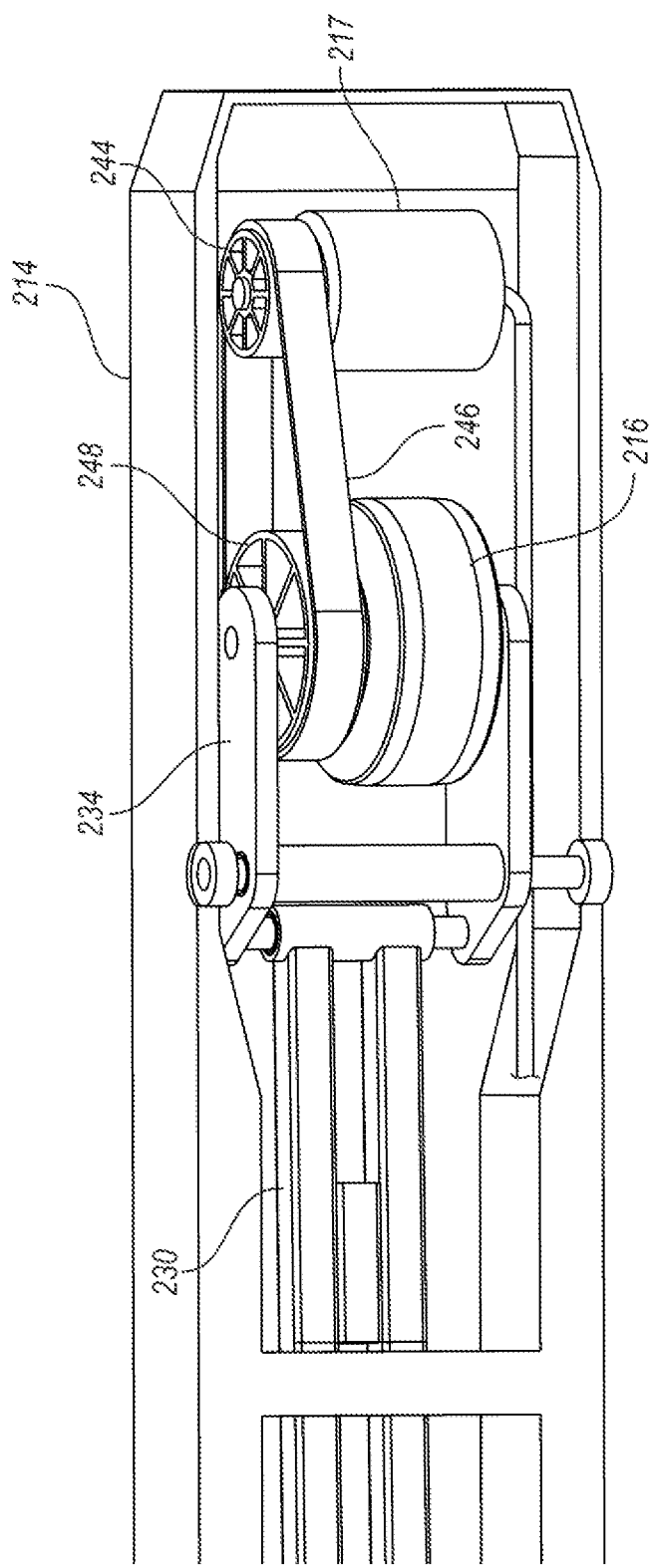
FIG. 14 is an enlarged view of the bottom of a forward end of one of the tines of the sled of FIG. 13.

FIGS. 13 and 14 show a powered sled 210 according to a third embodiment, which is similar to that of FIGS. 1-10, except as otherwise described or shown. The sled 210 includes a base 212 connected to a pair of tines 214, as before. The tines 214 are supported by load wheels 216 toward outer ends thereof, which are raised and lowered as before.

FIG. 14 is a bottom perspective view of one of the tines 214. The load wheel 216 is rotatably mounted at outer ends of the arms 234, which are pivotable to raise and lower the load wheel 216 relative to the tine 214 as driven by push rod 230. A drive motor 217 is mounted adjacent the load wheel 216 and secured to the tine 214. The motor 217 drives the load wheel 216 via a pair of pulleys 244, 248 and a belt 246. Alternatively gears or other mechanisms could be used to connect the motor 217 to the drive wheel 216. Again the drive motor 217 could be installed under both or just a single one of the tines 214.

Figure 15:
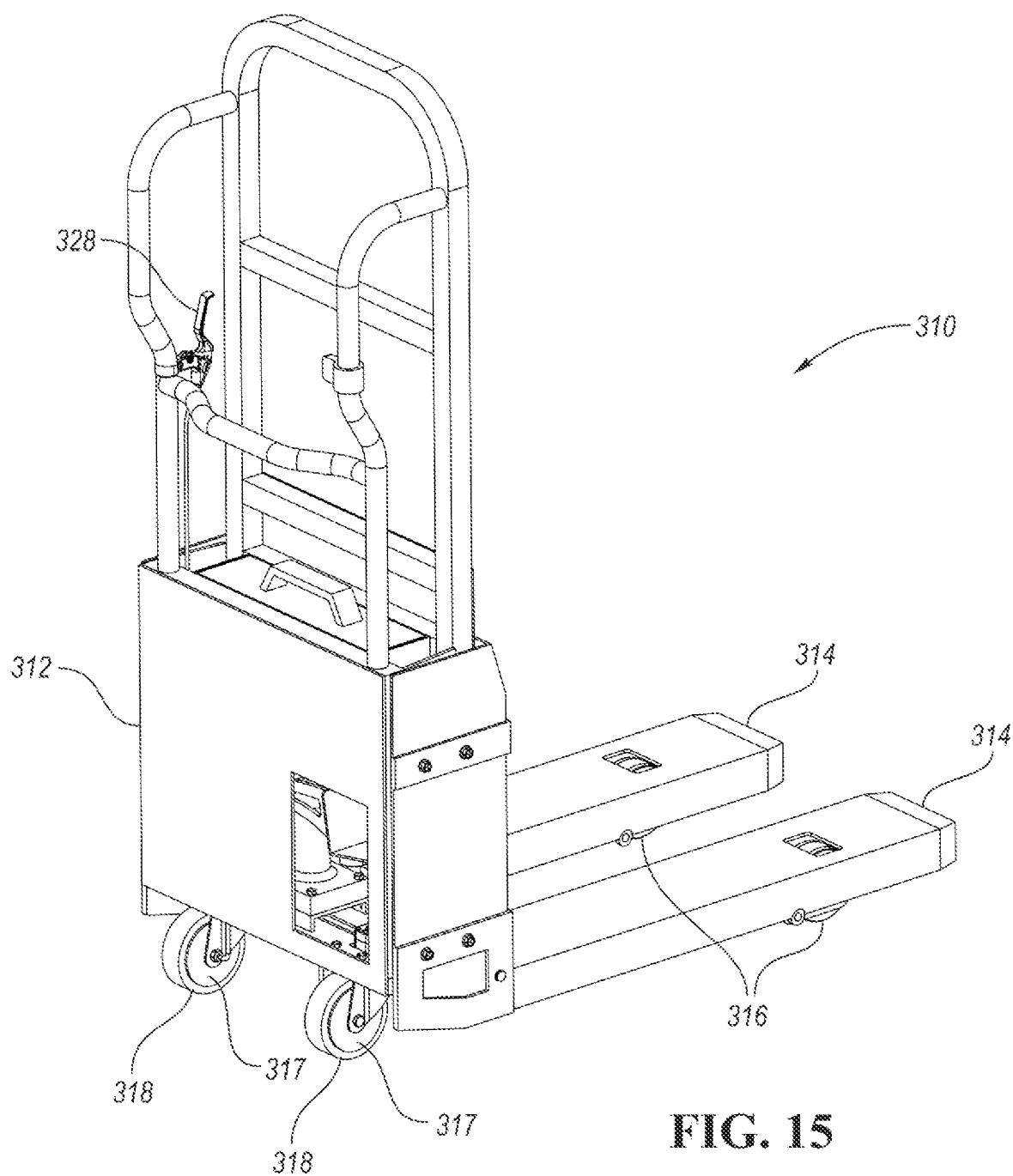
FIG. 15 is a perspective view of a sled according to a fourth embodiment.
Figure 16:
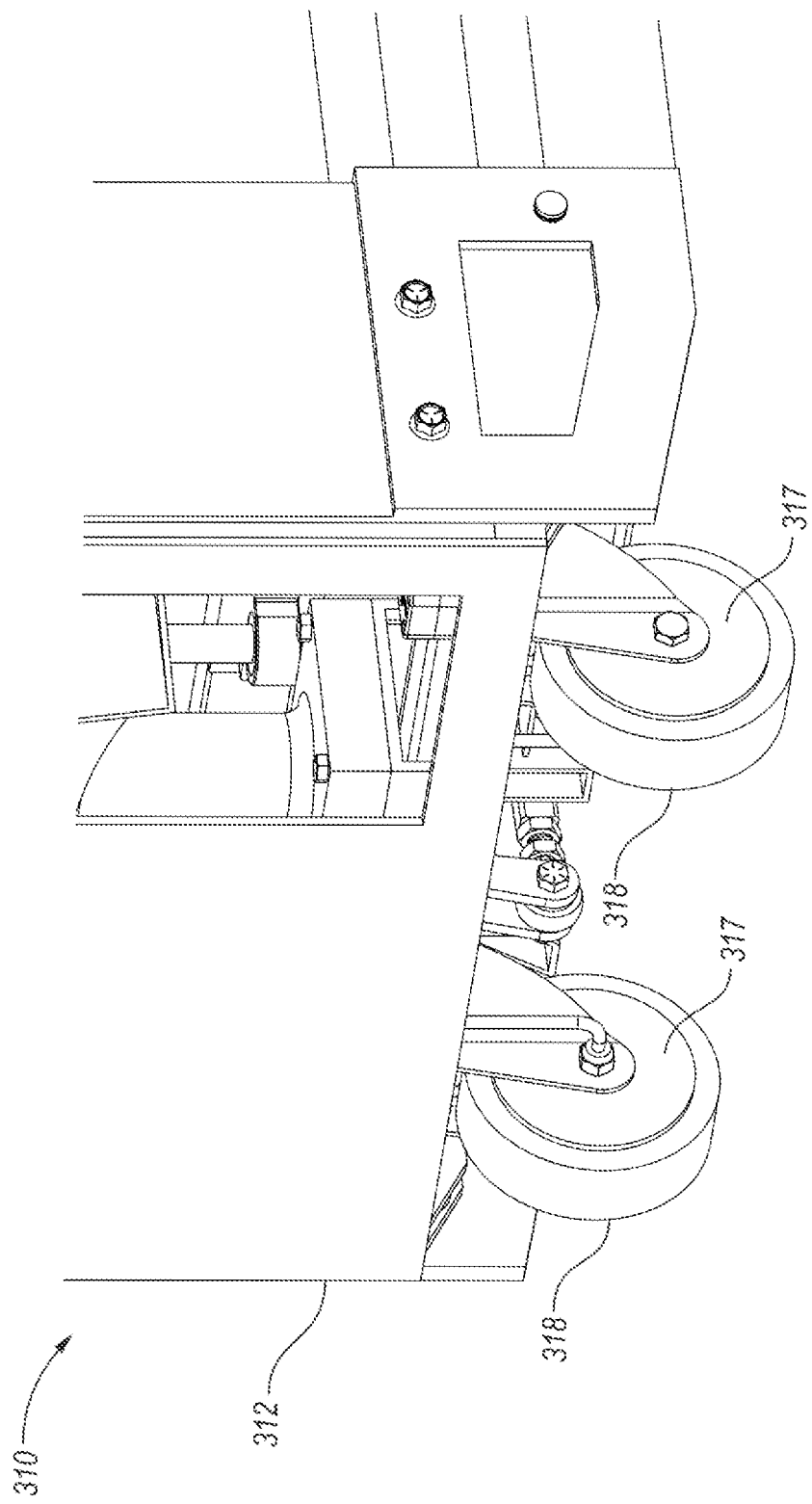
FIG. 16 is an enlarged view of a lower portion of the base of the sled of FIG. 15.

FIGS. 15 and 16 show a powered sled 310 according to a fourth embodiment, which is similar to that of FIGS. 1-10, except as otherwise described or shown. The sled 310 includes a base 312 connected to the tines 314. A load wheel 316 supports outer ends of each of the tines 314. In this embodiment, the wheels 318 under the base 312 include hub motors 317, again controlled by the throttle 328. Locating the hub motors under the base 312 instead of under the tines 314 permits larger wheels and larger hub motors to be used. Again, hub motors 317 could be placed in both wheels 318 or just one of the wheels 318. Optionally, one or more hub motors could also be placed in the load wheels under the tines as well. The hub motors 317 would be powered by the battery 322 as controlled by the throttle control 328.

Figure 17:
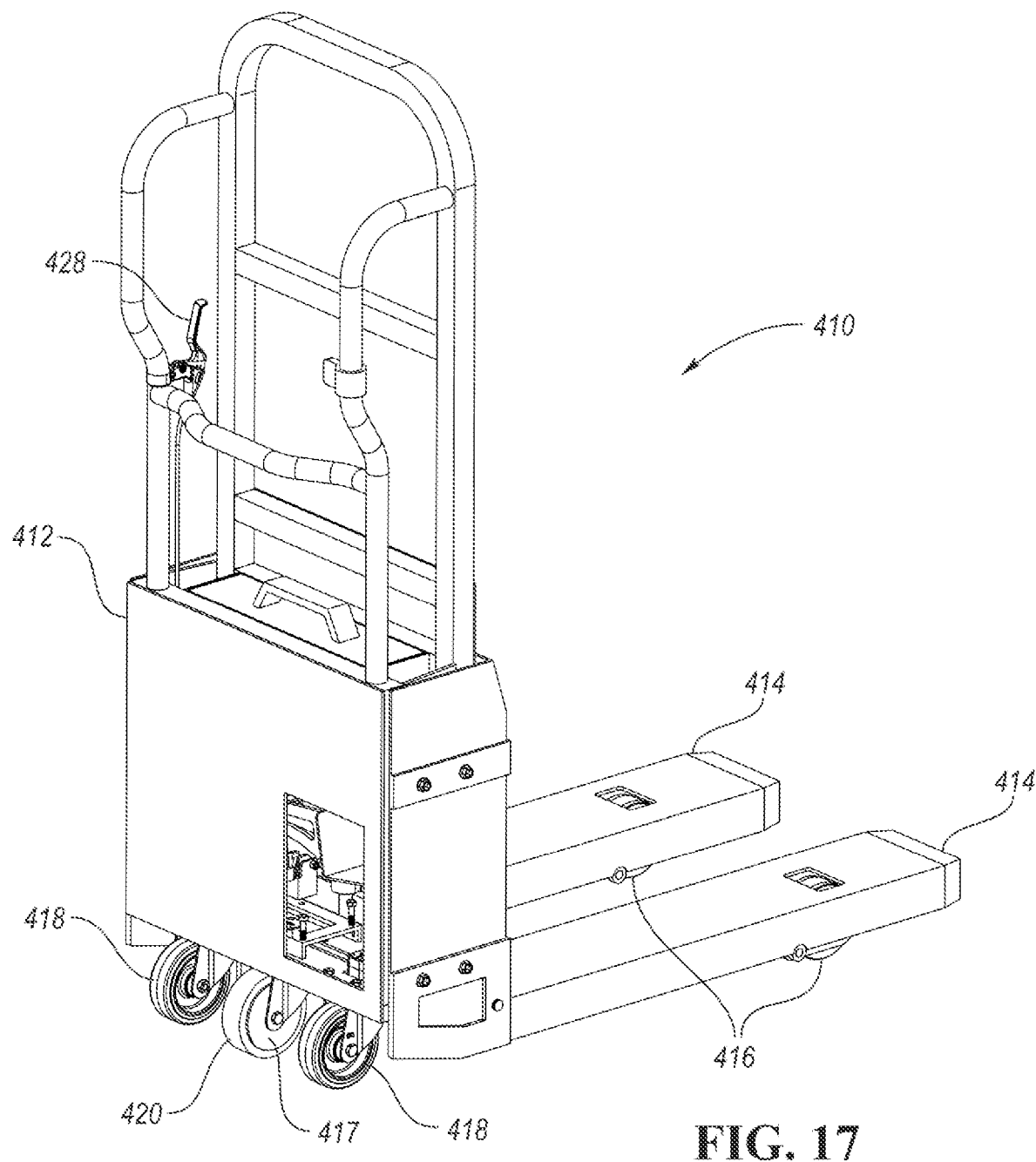
FIG. 17 is a perspective view of a sled according to a fifth embodiment.
Figure 18:
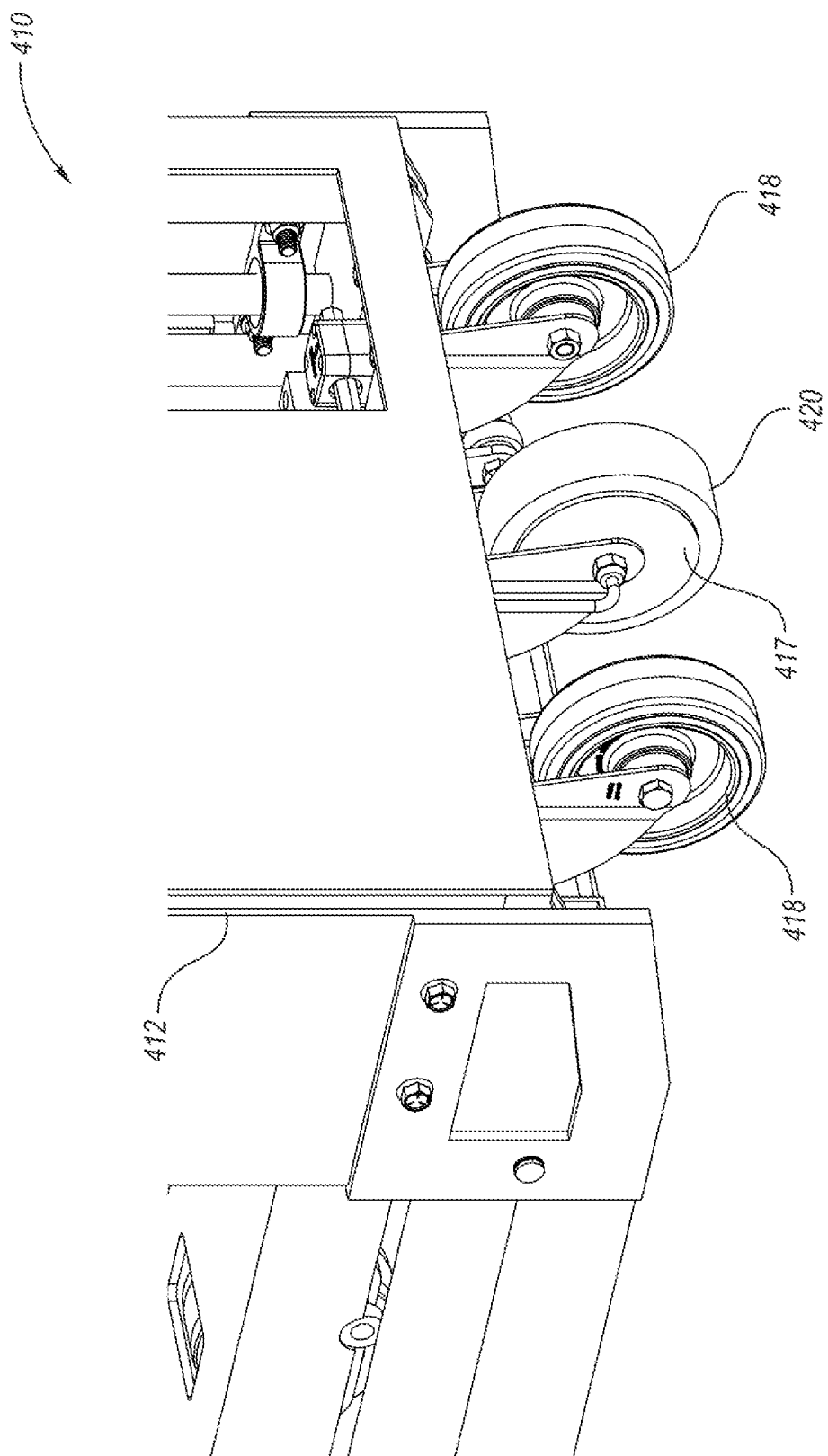
FIG. 18 is an enlarged view of a lower portion of the base of the sled of FIG. 17.

FIGS. 17 and 18 show a powered sled 410 according to a fifth embodiment which is similar to that of FIGS. 1-10, except as otherwise described or shown. The sled 410 includes a base 412 connected to the tines 414. A load wheel 416 supports outer ends of each of the tines 414. In this embodiment, there are two free-spinning wheels 418 and a single hub motor 417 and drive wheel 420 mounted between the free-spinning wheels 418. The hub motor 417 is again controlled by the throttle 428. The hub motor 417 of the drive wheel 420 would be powered by the battery 422 as selectively controlled by the throttle controller 428.

Figure 19:
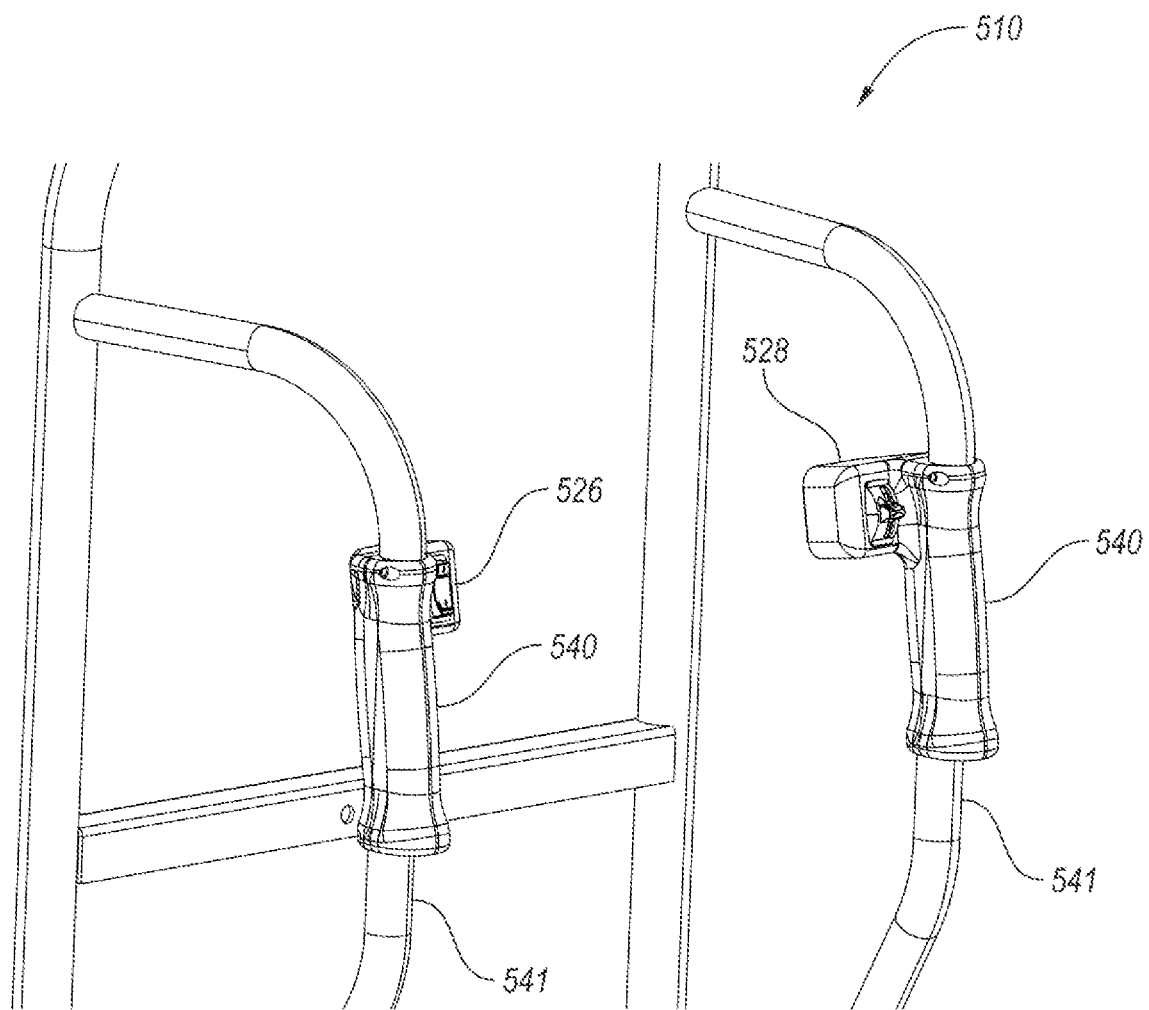
FIG. 19 is a perspective view of a control system that could be used in any of the above sled embodiments.
Figure 20:
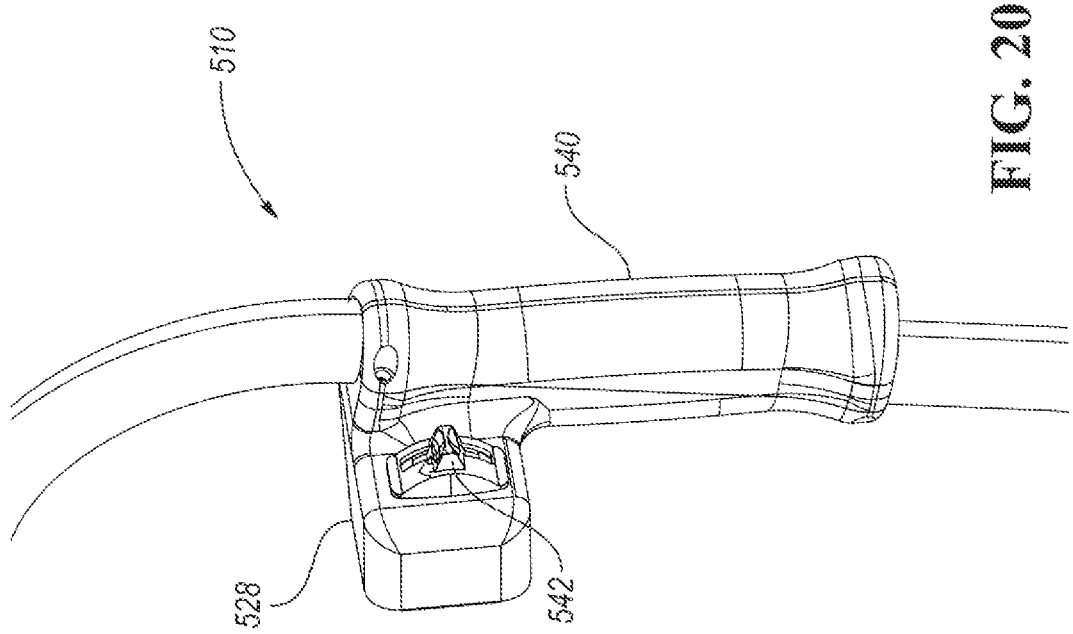
FIG. 20 is an enlarged view of the throttle control of FIG. 19.

FIGS. 19-21 show a control system 510 that could be used with the sleds of any of the above embodiments. A pair of grips 540 are mounted to generally vertical handlebars 541. A lift control 526 projects inward from one grip 540, while a throttle control 528 projects inward from the other grip 540. Referring to FIG. 20, the throttle control 528 includes a lever 542 biased to a middle position. The user can move the lever 542 upward with a thumb to drive the sled forward, or downward to drive the sled rearward. The speed may be controlled by how far the user moves the lever 542. Releasing the lever 542 returns the lever 542 to the center, stop position. The lever 542 also operates as a brake, by moving the lever 542 in the direction opposite movement of the sled. A throttle interlock may be integrated onto the front of the controls to be actuated by the user's fingers. This throttle interlock must first be pressed in before the lever 542 can be moved upward or downward to prevent unintended actuation of the drive system. Optionally the throttle interlock could be installed on the opposite grip 540 to require two-handed operation of the sled.

Referring to FIG. 21, the lift control 526 includes a rocker switch 544. Pressing the rocker switch 544 upward causes the tines to be raised. Pressing the rocker switch 544 downward causes the tines to be lowered. Releasing the rocker switch 544 returns the switch 544 to a middle, stop position.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet sled comprising:
a base;
a pair of casters supporting the base;
a first handlebar and a second handlebar extending vertically upward from the base and fixed relative to the base;
a pair of tines extending from the base;
a load wheel supporting outer ends of each of the tines, wherein each load wheel is mounted to an arm pivotably mounted to the respective tine, the pallet sled further including a rod in each tine configured to pivot the arm to move the respective load wheel toward and away from the respective tine; and
a hub motor within one of the load wheels, the hub motor configured to drive one of the load wheels to assist in moving the pallet sled, wherein the hub motor includes an axle received in a slot in the arm, wherein the slot opens downwardly.

2. A pallet sled comprising:
a base;
a pair of tines extending outward from the base;
a load wheel supporting outer ends of each of the tines, each load wheel mounted to an arm pivotably mounted to the respective tine;
a rod in each tine configured to pivot the arm to move the load wheel toward and away from the respective tine; and
a hub motor within one of the load wheels for driving the pallet sled, the hub motor including an axle received in a slot in the arm, wherein the axle has flats configured to prevent rotation of the axle within the slot.

3. A pallet sled comprising:
a base;
a pair of tines extending outward from the base;
a load wheel supporting outer ends of each of the tines, each load wheel mounted to an arm pivotably mounted to the respective tine;
a rod in each tine configured to pivot the arm to move the load wheel toward and away from the respective tine; and
a hub motor within one of the load wheels for driving the pallet sled, the hub motor including an axle received in a slot in the arm, wherein the hub motor includes an axle received in a slot in the arm, wherein the slot is substantially vertical.

4. A pallet sled comprising:
a base;
a pair of tines extending outward from the base;
a load wheel supporting outer ends of each of the tines, each load wheel mounted to an arm pivotably mounted to the respective tine;
a rod in each tine configured to pivot the arm to move the load wheel toward and away from the respective tine; and
a hub motor within one of the load wheels for driving the pallet sled, the hub motor including an axle received in a slot in the arm, wherein the slot is elongated and opens at one end through an edge of the arm.

5. A pallet sled comprising:
a base;
a pair of tines extending outward from the base;
a load wheel supporting outer ends of each of the tines, each load wheel mounted to an arm pivotably mounted to the respective tine;
a rod in each tine configured to pivot the arm to move the load wheel toward and away from the respective tine; and
a first hub motor within at least one of the load wheels for driving the pallet sled, the first hub motor including an axle received in a slot in the arm, wherein the slot opens downwardly.

6. The pallet sled of claim 5 further including a second hub motor within the other of the load wheels.

7. The pallet sled of claim 5 further including a removable battery pack received in the base, the battery pack configured to selectively operate the first hub motor.

8. The pallet sled of claim 5 wherein the slot is substantially vertical.

9. The pallet sled of claim 5 wherein the axle has flats configured to prevent rotation of the axle within the slot.

10. The pallet sled of claim 5 wherein the slot is elongated and opens at one end through an edge of the arm.

* * * * *